(12) United States Patent
Diehl et al.

(10) Patent No.: US 7,544,439 B2
(45) Date of Patent: Jun. 9, 2009

(54) VENTING WATER-TIGHT BATTERY-OPERATED DEVICES

(75) Inventors: Martin Diehl, Bad Vilbel (DE); Ulrich Fandrey, Wetzlar (DE); Uwe Schaaf, Alsbach-Hahnlein (DE); Florina Winter, Schmitten (DE)

(73) Assignee: The Gillette Company, Boston, MA (US)

( * ) Notice: Subject to any disclaimer, the term of this patent is extended or adjusted under 35 U.S.C. 154(b) by 812 days.

(21) Appl. No.: 11/115,931

(22) Filed: Apr. 27, 2005

(65) Prior Publication Data
US 2006/0243729 A1 Nov. 2, 2006

(51) Int. Cl.
*H01M 2/10* (2006.01)
*H01M 2/12* (2006.01)
*F16J 15/32* (2006.01)

(52) U.S. Cl. .............. 429/54; 429/55; 429/96; 277/552; 277/928

(58) Field of Classification Search .......... 429/53, 429/54, 55, 96, 98, 99, 100; 220/203.29, 220/745; 215/902; 277/552, 928
See application file for complete search history.

(56) References Cited

U.S. PATENT DOCUMENTS

| | | | | |
|---|---|---|---|---|
| 2,571,893 A | * | 10/1951 | Kendall | 429/54 |
| 2,670,396 A | * | 2/1954 | Field | 429/55 |
| 3,201,284 A | * | 8/1965 | Ellis | 429/55 |
| 3,417,795 A | | 12/1968 | Hesse | |
| 3,758,798 A | * | 9/1973 | Holly | 310/50 |
| 4,131,722 A | * | 12/1978 | Sugalski | 429/55 |
| 4,451,980 A | | 6/1984 | Shirakawa et al. | |
| 4,576,879 A | | 3/1986 | Nakazawa et al. | 429/86 |
| 4,584,248 A | | 4/1986 | Iwata | 429/54 |
| 4,815,697 A | * | 3/1989 | Skoda | 251/68 |
| 5,538,807 A | | 7/1996 | Hagiuda | |
| 2002/0045093 A1 | | 4/2002 | Imamura et al. | 429/96 |

FOREIGN PATENT DOCUMENTS

| | | |
|---|---|---|
| EP | 0 246 590 B1 | 11/1987 |
| EP | 0 415 378 A2 | 3/1991 |
| GB | 2 253 512 A | 9/1992 |

* cited by examiner

*Primary Examiner*—Stephen J. Kalafut
(74) *Attorney, Agent, or Firm*—John M. Lipchitz; Kevin C. Johnson; Steven C. Miller

(57) ABSTRACT

Water-tight battery powered appliances, for example personal care appliances such as razors and toothbrushes, are provided. The appliances include a housing having a seal that allows gases, e.g., hydrogen, to vent from the appliance without allowing water to enter.

10 Claims, 5 Drawing Sheets

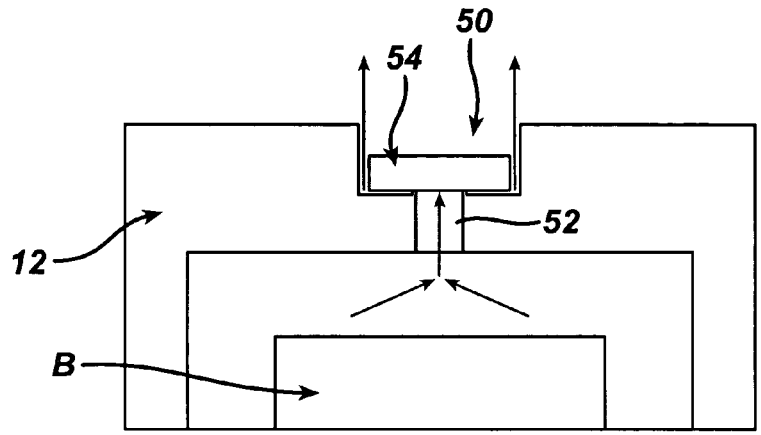
FIG. 2B
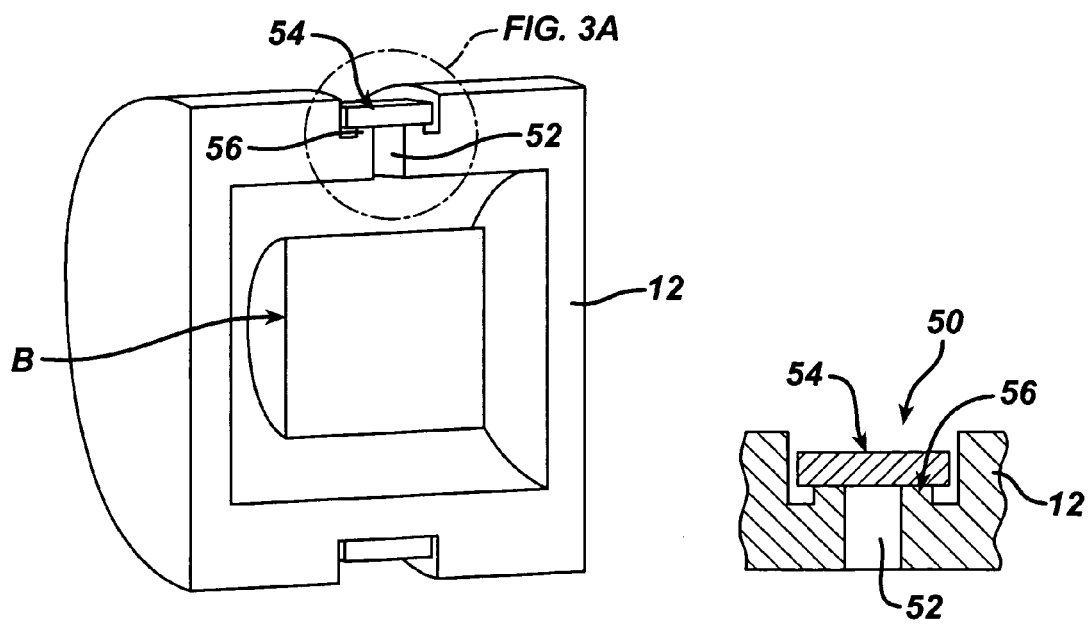
FIG. 3  FIG. 3A

VENTING WATER-TIGHT BATTERY-OPERATED DEVICES

TECHNICAL FIELD

This invention relates to venting a gas, e.g., hydrogen, from the interior of water-tight battery-operated devices, such as small appliances for personal care use.

BACKGROUND

Under certain conditions, hydrogen can accumulate in the interior of battery-powered appliances. The hydrogen may be released from the battery, or may be created by electrolysis outside the battery. Mixing of this hydrogen with ambient oxygen can form an explosive gas, which could potentially be ignited by a spark from the motor or switch of the device.

This problem has been addressed in various ways. In appliances and devices that do not need to be water-tight, the housing of the device will often contain an opening through which gases can vent.

In the case of devices that are operated in wet environments, for example electric toothbrushes and battery powered razors, the opening may be covered by a microporous membrane. The membrane is permeable to hydrogen gas, but impermeable to water. While this approach is generally effective in venting hydrogen from the interior of the device, the use of a membrane tends to be expensive and to increase the complexity of the product assembly process.

Another approach involves reacting the hydrogen gas rather than venting it. In this case, a hydrogenation catalyst is provided within the device to cause the hydrogen gas to react with oxygen and form water, and a silica dessicant is provided to absorb the water. Water-tight cameras utilizing this approach are described in U.S. 2002/0045093.

SUMMARY

In general, the present invention features battery-powered devices in which venting of gases (e.g., hydrogen) is provided through an aperture that is sealed by a seal that is normally closed and remains closed when pressure is applied from outside of the device, but opens when a predetermined internal pressure is exceeded. In some cases, the opening in the device housing that is sealed is an opening that serves another purpose in the device, e.g., an opening through which an actuator extends.

In one aspect, the invention features a water-tight, battery powered appliance including (a) a housing, having a generally hollow interior and an aperture through which gas can be vented from the interior; and (b) a seal, positioned to normally cover the aperture, the seal being configured to flex in response to pressure within the hollow interior and move away from the aperture when a predetermined pressure, for example about 0.1 to 2 bar, is exceeded.

The appliance may be a personal care appliance, such as a razor or toothbrush. Thus, the appliance may further include a razor cartridge or toothbrush head mounted on the housing.

The functionality of the appliance may be turned on and off using an actuator. The actuator may in some cases extend from the aperture. In such cases, the seal may surround a stem portion of the actuator.

In some instances, the seal includes an elastomeric member, for example a bellows-type seal or a ring-shaped elastomeric gasket. The aperture may be positioned within a circumferential groove in an outer surface of the housing, and the seal may include a ring-shaped element, e.g., an elastomeric gasket, positioned in the groove to cover the aperture. The ring-shaped element may be pre-stressed to hold the ring-shaped element taut against the outer surface of the housing.

In another aspect, the invention features a water-tight, battery powered appliance including (a) a housing, having a generally hollow interior defining an inner wall, the housing having an aperture through which gas can be vented; (b) a carrier, disposed within the housing and configured to hold a battery, the carrier having an aperture through which gas can be vented; (c) a first seal, positioned between the carrier and the inner wall of the housing, allowing fluid communication between the aperture in the housing and the aperture in the carrier, but sealing against passage of fluid past the first seal into the housing; and (d) a second seal, positioned to normally cover the aperture in the carrier, the seal being configured to flex in response to pressure within the hollow interior and move away from the aperture when a predetermined pressure is exceeded.

In some cases, the first and second seals each comprise an elastomeric member. The housing and carrier may both be generally cylindrical, in which case the first seal may include a pair of ring-shaped gaskets, positioned one on each side of the apertures in the carrier and housing to isolate the apertures from the rest of the housing.

The details of one or more embodiments of the invention are set forth in the accompanying drawings and the description below. Other features and advantages of the invention will be apparent from the description and drawings, and from the claims.

DESCRIPTION OF DRAWINGS

FIG. 2B is an enlarged diagrammatic view of the upper portion of FIG. 2, illustrating the gas flow path in this embodiment.

FIG. 3 is a diagrammatic view of a portion of an appliance according to a further embodiment of the invention. FIG. 3A is an enlarged detail view of area A in FIG. 3.

DETAILED DESCRIPTION

Figure 1:
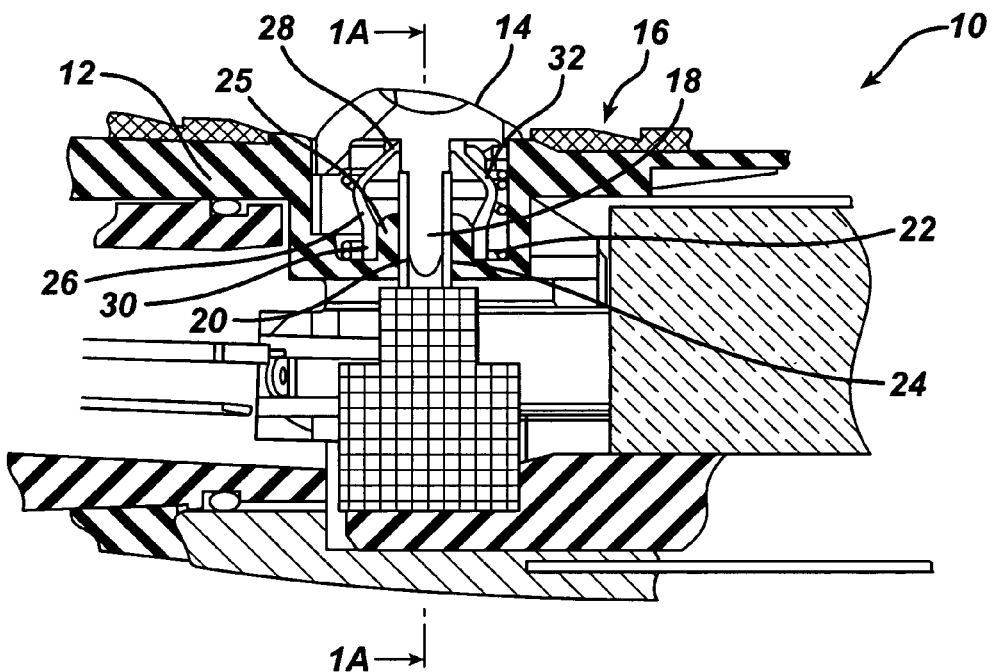
FIG. 1 is a partial axial cross-sectional view of an appliance according to one embodiment of the invention.
Figure 1A:
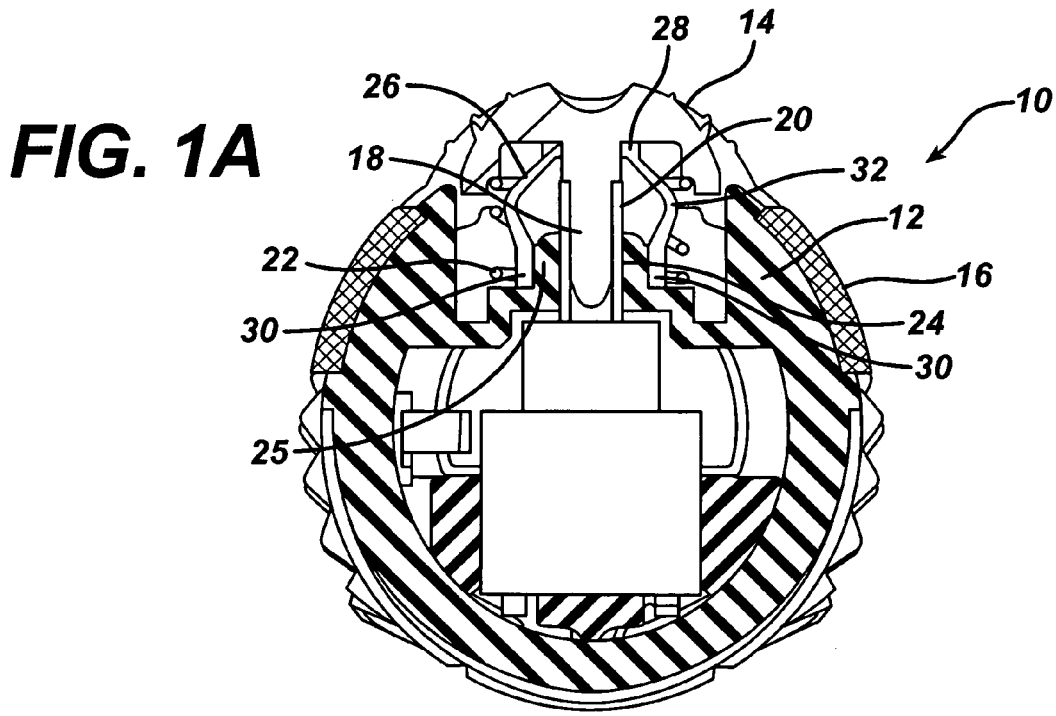
FIG. 1A is a radial cross-sectional view taken along line A-A in FIG. 1.

Referring to FIGS. 1-1A, an appliance 10, for example a razor or toothbrush, includes a generally cylindrical handle housing 12. A battery (not shown) is disposed within the housing when the appliance is used, resulting in the possible generation of hydrogen gas. The housing 12 is sealed in a water-tight fashion. An actuator button 14 is exposed at the outer surface 16 of the housing, allowing a user to depress the button to activate the functionality of the device, for example the brushing function of a power toothbrush head, or a vibrating function of a battery-powered razor for wet shaving. The actuator button extends from a stem 18. Stem 18 is press-fit into a sleeve 20 which slides down when the button is depressed, activating the functionality of the device (how this occurs will not be discussed, as it is not relevant and will differ from device to device). The actuator button is returned to its normal, non-depressed position by a return spring 22.

The opening around the sleeve 20 and the adjacent wall 24 of flange 25 of the housing 12 must be sealed in order for the device to be completely water-tight. Sealing is provided by a bellows seal 26 having an upper sealing ring 28, a lower sealing ring 30, and an outwardly bowed bellow 32. Upper sealing ring 28 seals against the intersection of the lower surface of the button with the upper end of the stem, while lower sealing ring 30 seals against the outer surface of flange 25. Under normal interior pressure conditions, the bellow 32 resiliently biases the sealing rings against the surfaces they seal against. Preferably, bellows seal 26 is an elastomeric seal that is pre-stressed into its sealing configuration by stretching it over the flange 25.

When a predetermined interior pressure within the housing is exceeded, e.g., 0.1 to 2 bar, indicating the presence of hydrogen gas, the bellows seal flexes, temporarily breaking the seal at the upper and/or lower sealing ring (generally at the lower sealing ring) and allowing the gas to vent from the device. Normally, the path of gas is through a gap between the sleeve 20 and the flange 25, into the chamber defined by the inner wall of the bellow 32, and then, as the seal is broken, past the lower sealing ring and through a gap between the button 14 and the housing 12.

As soon as pressure within the housing normalizes, the bellows seal returns to its normal, unflexed position in which it renders the device water-tight. Because the seal is only broken for a very short time and to a very small extent, and because the interior pressure is higher than the external pressure, it is unlikely that any water will penetrate into the device during venting.

The resiliency of the elastomeric seal, and the extent to which it is pre-stressed (i.e., the extent to which the diameters of the upper and lower sealing rings are smaller than the diameters of the parts they seal against), will depend on the predetermined pressure threshold that is acceptable in a particular device.

Figure 1B:
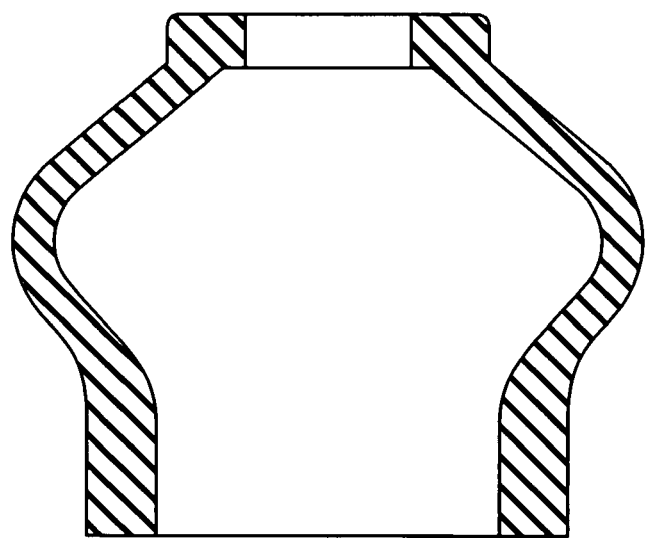
FIG. 1B is an enlarged cross-sectional view of the sealing member used in the appliance of FIG. 1.

In one example, the bellows seal is formed of a liquid silicone rubber (LSR) having a hardness of about 50 Shore A and a pre-stress of about 15 to 40%, and is constructed to vent when the internal pressure exceeds 0.3 bar. The geometry of this seal is shown in detail in FIG. 1B.

If desired, the bellows seal may be replaced by a seal having a single sealing ring, rather than two sealing rings as described above. For example, the upper sealing ring 28 may be omitted.

Figure 2:
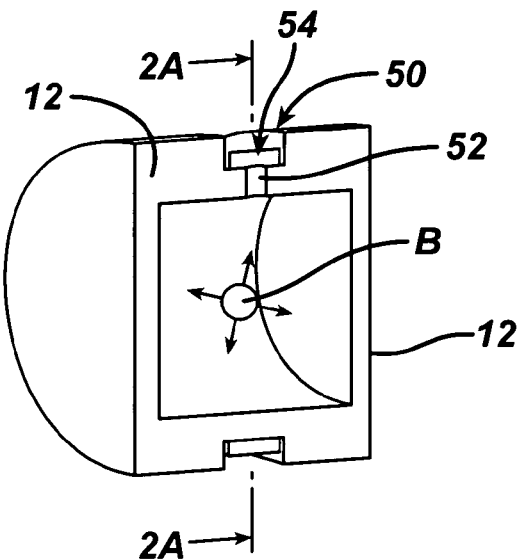
FIG. 2 is a diagrammatic view of a portion of an appliance according to another embodiment of the invention.
Figure 2A:
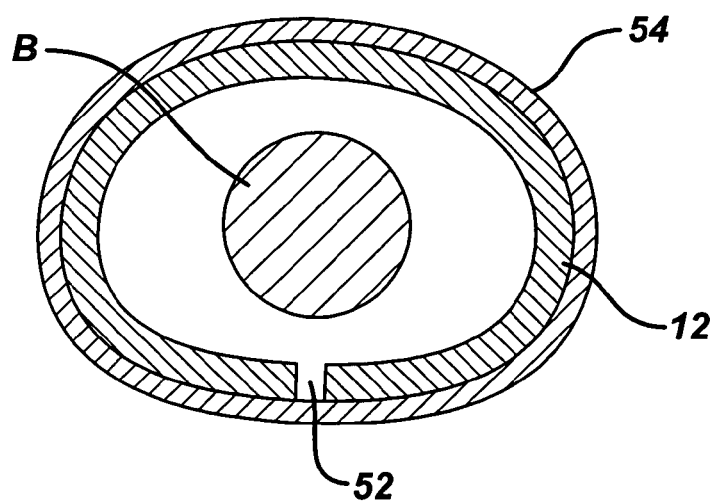
FIG. 2A is a radial cross-sectional view taken along line A-A in FIG. 2.

The appliance may include an opening that does not have an actuator button extending therethrough. For example, as shown in FIGS. 2-2B, the housing 12 may include a groove 50 in which a vent aperture 52 is recessed. A ring-shaped sealing element 54, e.g., an elastomeric gasket, is positioned in the groove 50 to seal aperture 52. The sealing element is pre-stressed to seal it against the surface of groove 50. Pre-stressing is generally achieved by stretching the sealing element 54 onto the groove; i.e., the diameter of the sealing element is slightly smaller than that of the housing in the groove. It is generally necessary that the material of the sealing element be sufficiently flexible so that the sealing element can be stretched over the larger-diameter areas of the housing when assembling it into the groove.

As shown in FIG. 2B, when battery B outgases, the increased internal pressure within housing 12 will slightly stretch the sealing element 54, forcing it away from the surface of the groove in the area of the aperture 52. This will allow the gas to vent around the sealing element 54, as indicated by the arrows in FIG. 2B. As discussed above, venting is so brief, and the extent to which the seal is displaced is so small, that it is very unlikely that water will enter the device during venting.

In one example, sealing element 54 is formed of an elastomer commercially available under the tradename VITON, having a hardness of about 70 Shore A and a pre-stress of about 10 to 20% and being contructed to vent when the internal pressure exceeds 0.3 bar.

Referring now to FIGS. 3 and 3A, in some cases a small raised island 56 may be provided around aperture 52 in groove 50. This raised island will tend to concentrate the pre-stress force of the gasket around the perimeter of aperture 52, increasing the sealing force so that, for a given sealing ring design, a higher internal pressure will be required to break the seal. This is particularly helpful for think sealing rings.

Figure 4:
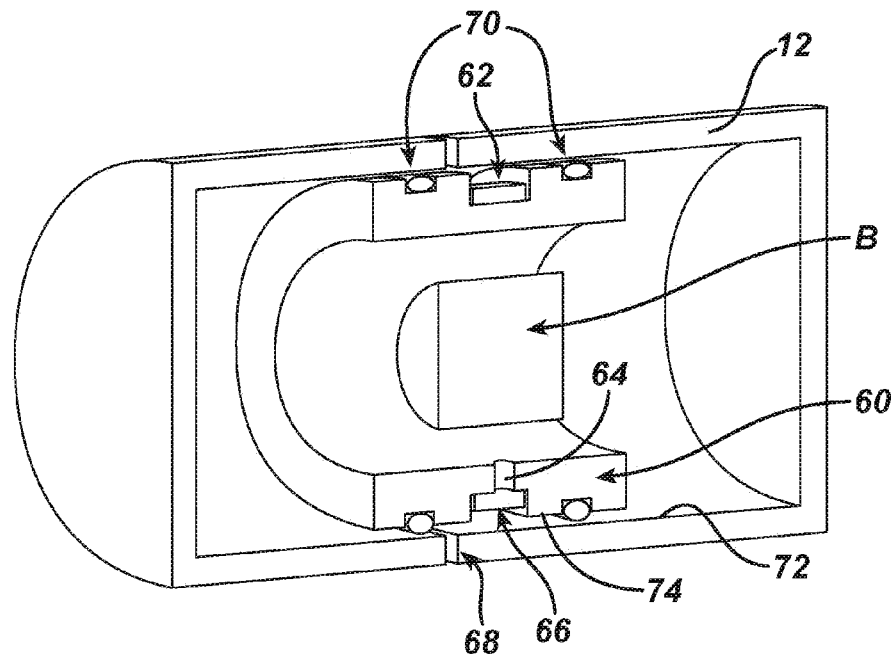
FIG. 4 is a diagrammatic view of a portion of an appliance according to yet another embodiment of the invention.
Figure 4A:
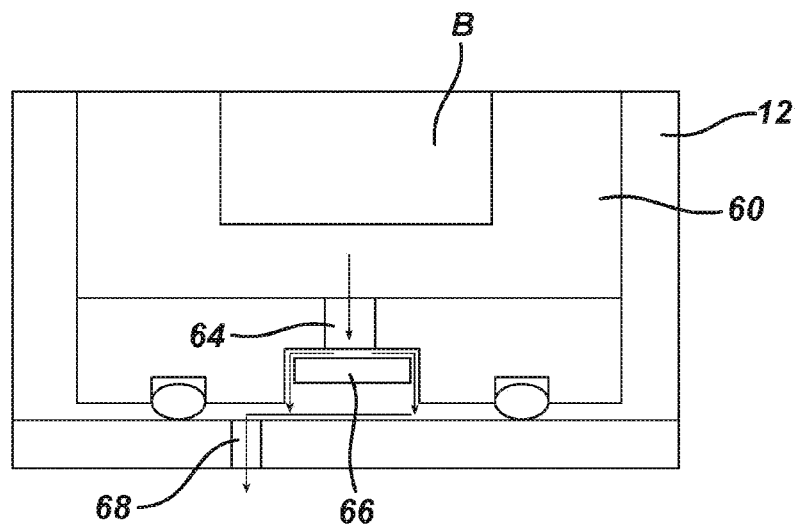
FIG. 4A is an enlarged diagrammatic view of the lower portion of FIG. 4, illustrating the gas flow path in this embodiment.

In some cases, the battery may be contained in a carrier within the housing. For example, as shown in FIGS. 4-4A the battery B may be contained in a carrier 60 having a groove 62, a venting aperture 64 within the groove, and a ring-shaped sealing element 66 sealing the aperture, similar to the embodiment discussed above. It is important that, when gas exits the venting aperture 64, it exits the housing, rather than becoming trapped in the interior of the housing. Thus, the housing includes a venting aperture 68, disposed relatively close to the venting aperture 64. If desired, the venting aperture 68 may be a seam line along which two parts of the housing may be separated from each other, for example the main body of the housing and the battery compartment cover. To prevent ingress of gas from the aperture 64 or water from the aperture 68 into the interior of the housing, a seal 70 is provided between the inner wall 72 of housing 12 and the outer wall 74 of carrier 60 on either side of the apertures. The seal may be in the form of a pair of elastomeric o-rings, as shown, or any other suitable type of seal. Seal 70 is designed to remain unbreakable at any foreseeable pressure within the area between walls 72 and 74, preventing any leakage from this area into the housing. The gas flow path during venting is first out through aperture 64 and then out through aperture 68, as shown in FIG. 4A. In this embodiment, the sealing member 66 may be visually hidden and protected by one part of the housing (e.g., the main housing body, shown on the right hand side in FIG. 4). The carrier 60 may be permanently locked and sealed to the main housing body by one of the o-rings, so that the sealing member 66 is shielded by the main housing body, while the battery compartment cover can be removed to allow replacement of the battery.

A number of embodiments of the invention have been described. Nevertheless, it will be understood that various modifications may be made without departing from the spirit and scope of the invention. For example, the venting aperture and sealing member may be provided in other areas of the housing and may have different relative geometries. As but one example, the circumference of the groove discussed above may be generally elliptical. Moreover, while razors and toothbrushes have been mentioned above, the seals discussed herein may be used in any type of water-tight appliance, for example flashlights, battery powered scrub brushes, cameras and the like. Accordingly, other embodiments are within the scope of the following claims.

What is claimed is:

1. A water-tight, battery powered appliance comprising:
   a housing, having a generally hollow interior defining an inner wall, the housing having an aperture through which gas can be vented;

a carrier, disposed within the housing and configured to hold a battery, the carrier having an aperture through which gas can be vented;

a first seal, positioned between the carrier and the inner wall of the housing, allowing fluid communication between the aperture in the housing and the aperture in the carrier, but sealing against passage of fluid past the first seal into the housing; and a second seal, positioned to normally cover the aperture in the carrier, the seal being configured to flex in response to pressure within the hollow interior and move away from the aperture when a predetermined pressure is exceeded.

2. The appliance of claim 1 further comprising a razor cartridge mounted on the housing.

3. The appliance of claim 1 further comprising a toothbrush head mounted on the housing.

4. The appliance of claim 1 wherein the first and second seals each comprise an elastomeric member.

5. The appliance of claim 1 wherein the housing and carrier are both generally cylindrical, and the first seal comprises a pair of ring-shaped gaskets, positioned one on each side of the apertures in the carrier and housing to isolate the apertures from the rest of the housing.

6. The appliance of claim 1 wherein the predetermined pressure is between about 0.1 bar and 2 bar.

7. The appliance of claim 1 wherein the aperture in the carrier is positioned within a circumferential groove in an outer surface of the carrier.

8. The appliance of claim 7 wherein the second seal comprises a ring-shaped element positioned within the groove to cover the aperture.

9. The appliance of claim 8 wherein the ring-shaped element comprises an elastomeric gasket.

10. The appliance of claim 8 wherein the ring-shaped element is pre-stressed to hold the ring-shaped element taut against the outer surface of the housing.

* * * * *